United States Patent [19]
Nilsen, Jr.

[11] 3,747,964
[45] July 24, 1973

[54] QUICK COUPLING AND SEAL
[76] Inventor: Norman P. Nilsen, Jr., P.O. Box 33, Phelan, Calif. 92371
[22] Filed: Dec. 15, 1971
[21] Appl. No.: 208,370

[52] U.S. Cl.................. 285/337, 285/354, 285/359, 285/369
[51] Int. Cl............................................. F16l 17/00
[58] Field of Search................... 285/337, 346, 330, 285/354, 359, DIG. 7, 364, 423

[56] References Cited
UNITED STATES PATENTS
2,478,149  8/1949  Wolfrom et al................. 285/354 X
3,312,484  4/1967  Davenport...................... 285/423 X
3,574,362  4/1971  Gregg................................. 285/423
FOREIGN PATENTS OR APPLICATIONS
771,968  4/1967  Great Britain................. 285/DIG. 7

Primary Examiner—Dave W. Arola
Attorney—William H. Maxwell

[57] ABSTRACT

A coupling and seal for fluid conducting piping and particularly adapted to plastic pipe, to quickly couple sections thereof, and utilizing elastomeric seal rings pressed so as to frictionally engage onto one tubular member to thereby connect it to a second tubular member. The invention resides primarily in a tubular coupling member and cooperating nut which together form a ring groove in which a seal is pressed and/or pressured so as to constrict onto the said second tubular member. A feature is the quick make and break connection that is provided, utilizing a bayonet slot with nut lugs cooperating with extended inclined planes and a stop to limit seal distortion.

12 Claims, 6 Drawing Figures

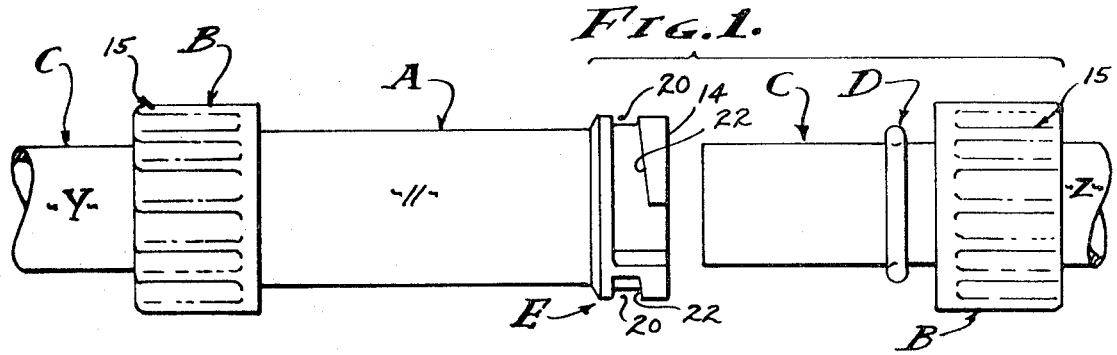
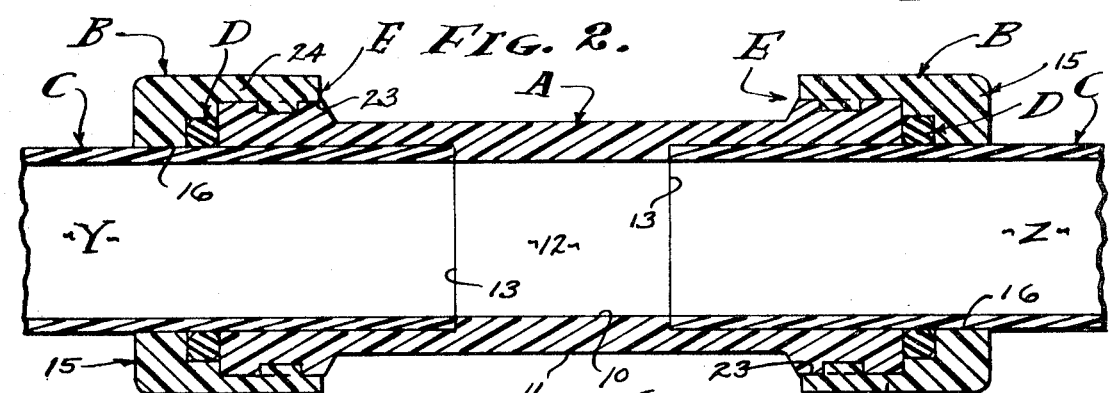
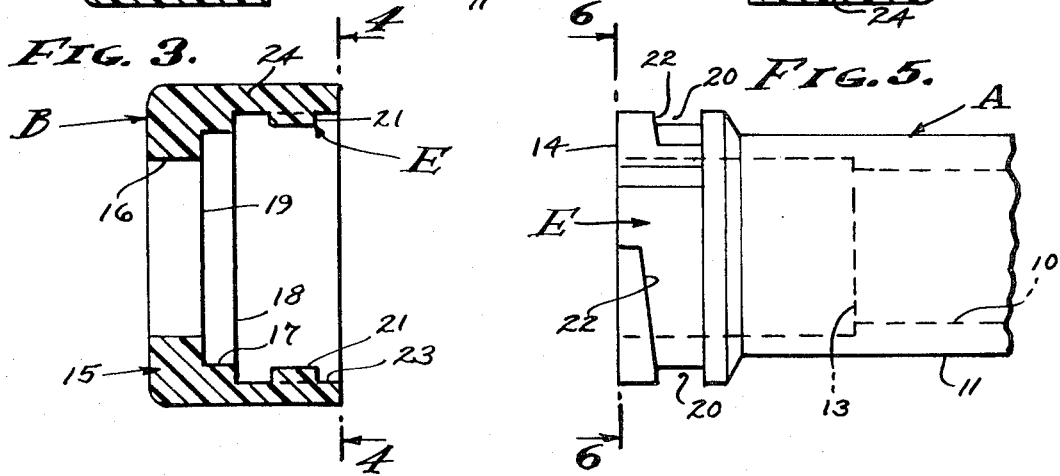
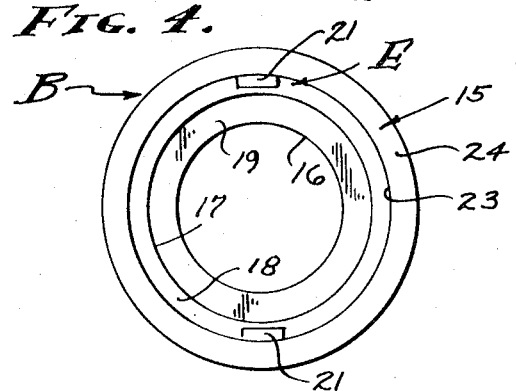
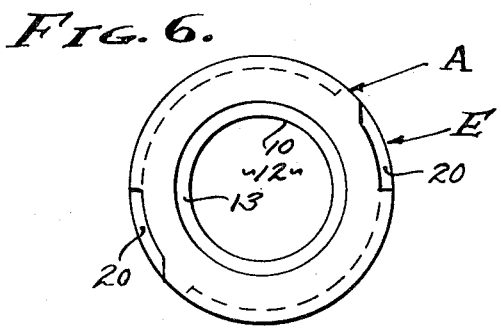

3,747,964

QUICK COUPLING AND SEAL

BACKGROUND

The coupling together of pipe sections is tedious and normally requires special tools dependent upon the method employed. For example, metal pipes are threaded and screwed together using couplings in the form of nipples and unions; and plastic pipes are cemented or fused together using couplings specially prepared therefor. Thus and in any case, coupling members are employed and in one instance require revolvement for connection and in the other instance require cements and/or solvents that must be carefully applied for a one-time connection. These two types of connections exemplify the prior art, and each with its shortcomings. That is, the threading method requires tools for revolving the pipe and various fittings to suit the installations; and the plastic method requires the careful and expert one-time application of cement and/or solvent. And, it is an object of this invention to provide sealed coupling of plastic piping with the advantages of disassembly, whereby alteration and repair of other related components is facilitated, and providing a quick connection wherein mechanical and leak proove joinder is assured.

FIELD OF INVENTION

This invention relates to a coupling member and cooperating nut therefor, useful in connecting to the otherwise unprocessed end of a pipe section, it being a general object to provide a practical coupling and nut combination which interdependently establish a mechanical coupling and leak proof seal.

The rotative positioning of pipe sections is often an installation limitation and it is therefor an object of this invention to provide an effective coupling in no way dependent upon rotation of eith the coupling body or pipe section. With the coupling and seal herein disclosed, the pipe sections and tubular coupling members are telescoped together without rotative adjustment, and it is the nut which carries the seal into cooperative engagement with said tubular member.

The common method of connecting pipes and tube sections requires the repeated revolvement of parts, relying upon threaded engagement for axial coupling and upon independent sealing means. It is an object of this invention to eliminate repeated revolvement of parts and to gain a coupling and seal with partial revolvement. With the present invention the nut that carries the seal is provided with lugs which advance onto exterior inclined planes disposed on an acute helix, thereby generating a mechanical advantage of high order; and it is the seal which is thereby compressed to frictionally engage upon the exterior of the pipe section entered into the tubular coupling member.

Generally, it is an object of this invention to provide a tube and nut combination which together with an elastomeric ring, simultaneously functions as a mechanical coupling and a gland, and to the end that pipe sections are reliably joined and sealed against leakage of fluids carried therein.

SUMMARY OF THE INVENTION

This invention involves a tubular body A to which a nut B is applied over a pipe section end C that is telescopically entered into said body and mechanically engaged and sealed therewith by means of a distortable ring D that is cooperatively related to said body A and carried by the nut B into pressured engagement therewith and consequent constriction onto the pipe section end C. A feature of the combination is the releasible securing means E which is provided to force the nut B onto the body A with the distortable ring D pressured therebetween so as to constrict onto the pipe section end C.

DRAWINGS

The various objects and features of this invention will be fully understood from the following detailed description of the typical preferred form and application thereof, throughout which description reference is made to the accompanying drawings, in which:

FIG. 1 is a partially exploded view of the pipe and coupling assembly of the present invention.

FIG. 2 is an enlarged detailed sectional view taken longitudinally through a completed coupling installation.

FIG. 3 is a section view of the nut configuration, and

FIG. 4 is an end view thereof taken as indicated by line 4—4 on FIG. 3.

FIG. 5 is a side view of the coupling, and

FIG. 6 is an end view thereof taken as indicated by line 6—6 on FIG. 5.

PREFERRED EMBODIMENT

Referring now to the drawings, the quick coupling and seal can be incorporated in various fitting configurations and is shown embodied in a straight nipple type coupling X to be used in connecting to pipes Y and Z. The coupling X involves, generally, the tubular body A and a nut B and distortable ring D for each pipe connection. A great advantage of the present invention is the manner in which the pipes Y and Z are prepared, in that they are simply cut to approximate length as may be required; following which the nuts slide onto the pipe section ends C and the rings D are stretched onto said pipe ends to reatin the nuts prior to coupling engagement. The pipe ends C are then offered up and entered into the coupling body A, whereupon the make and break means E is operated to press the ring D and tereby effect the coupling engagement and seal.

Coupling body A is a tubular element having at least one coupling and seal of configuration to cooperatively receive a pipe section end C and nut B and ring D assembled thereon. The body A is preferably round in cross section the inner and outer diameter walls 10 and 11 establishing a cylindrical flow passage 12 therethrough. A stop shoulder 13 is provided deep within the passage to stop the pipe section end with a proper insertion length, so as to assure lateral stability in the pipe connection; for example an insertion depth equal to several diameters of pipe. In practice, the pipe section end C slides freely into the inner diameter wall 10. A feature of the body A is the terminal end 14 thereof which is in a plane normal to the central axis thereof and of a radial extent equal to or exceeding slightly the corresponding radial dimension of the distorable ring D, and it is the end 14 which thereby establishes one channel wall of the coupling and sealing groove formed as later described.

The distortable ring D can vary in cross sectional configuration and is preferably an O-ring of elastomeric material, having known adaptability to establish effective fluid tight seals. With the present invention an additional function is derived from the distortable ring D in that it is forceably constricted onto the pipe section end C to frictionally engage therewith. In accordance with this invention, therefore, materials are employed in the body A and ring D which produce a high coefficient of friction, the ring D being made of rubber or a synthetic substitute such as Neoprene, and the body B being made of polyvinylchloride or a like plastic. In the presence of water conducted through the coupling and seal, mechanical engagement of high order is maintained. Accordingly, an elastomeric O-ring D of typical toroidal configuration is employed, having a minor diameter somewhat less than the outside diameter of the pipe onto which it is necessarily stretched. Thus, the O-ring D will frictionally hold a temporary position encircling the pipe section end C.

The nut B is characterized by its counterbored cylindrical form which cooperates with the terminal end 14 of a body A to establish a channel of predetermined cross sectional configuration. In accordance with this invention, therefore, the nut B comprises a body 15 complementing the body A and with a bore 16 therethrough to freely pass the pipe section end C and a counterbore 17 opening therein at a face 18 adapted to opposedly engage the body end 14. The nut body 15 is of limited axial extent with the counterbore terminating at a wall 19 spaced from and parallel with face 18, both in planes normal to the central axis of the nut. The counterbore diameter substantially equals and does not exceed the planar diameter of the body end 14, and the composite cross section of the channel formed thereby over the pipe section end C is rectangularly square and smaller than the undistorted initial diameter cross section of the O-ring D. Thus, the elastomeric material of the ring D is pressed and thereby elastically distorted into a squared configuration, more or less occupying the channel formed between the body A and nut B, as shown.

The releasible securing means E of the present invention is incorporated in cooperative features of the body A and nut B and is operative to forceably urge the face 18 of the nut into engagement with the terminal end 14 of the body. In its preferred form, the means E involves a balanced arrangement of bayonet slots 20 in the exterior cylinder wall 11 of body A and cooperating lugs 21 carried by the nut B and operably engageable in said slots respectively. In practice, I employ diametrically opposite slots 20 formed into the exterior of a cylindrical enlargement coextensive with the end portion of the body A, and in each instance the slot enters said enlargement outside the sealing perimeter of face 18 to extend axially and then circumferentially. The slots 10 extend right handedly for clockwise rotation of the lugs 21 and each slot has a helical wall 22 disposed at an acute angle faced away from the face 18. When diametrically opposite slots and corresponding lugs are employed, the acute helix thereof extends up to somewhat less than 180° in each instance.

Referring now to the nut B and the lugs 21 of the releasible securing means E, each lug is an inward projection from the inner diameter 23 of a sleeve 24 that extends from the nut body 15 to overlie the aforementioned enlargement of the end portion of body A. It will be seen that the nut B is to be drawn into operating position through less than one-half a revolution, forceably pressing the elastically deformable O-ring D into the substantially square predetermined cross section (see FIG. 2) with the channel configuration determined by the engagement of face 18 with the terminal end of body 14.

From the foregoing it will be clear that I have provided a quick acting and effective coupling and seal, comprising the fewest possible number of parts and elements, and which is reliable in its operation to mechanically engage with pipe sections and to effectively seal therewith. Upon assembly it is a simple matter to cut a pipe section to approximate length, without regard to precision, and to thereupon temporarily assemble a nut B and O-ring thereupon and which are retained in readiness for installation. The pipe section end C to be connected is inserted into working position against the stop 13, whereupon the nut B is advanced into position and rotated, carrying the O-ring seal D therewith and pressing it elastically into the confines of a channel having predetermined cross section thereby assuring the functions desired.

Having described only a typical preferred form and application of my invention, I do not wish to be limited or restricted to the specific details herein set forth, but wish to reserve to myself any modifications or variations that may appear to those skilled in the art:

I claim:

1. A coupling and seal for connecting to the cylindrical exterior of the end portion of a pipe and including, a tubular body with a passage therethrough opening at a terminal end in a plane normal to the central axis thereof, a nut having a bore engageable over the cylindrical exterior of the pipe and with a counterbore terminating at a shoulder therein opening at a face opposing said terminal end of the body for stopped engagement, an annular seal of elastomeric material axially compressed in the channel formed by said terminal end and counterbored nut stopped thereby, and a releasible securing means urging the nut axially into stopped engagement with the body determining the axial compression of said annular seal.

2. The coupling and seal for a pipe connection as set forth in claim 1 and wherein the annular seal is of O-ring configuration.

3. The coupling and seal for a pipe connection as set forth in claim 1 and wherein the annular seal is of O-ring configuration initially formed with a greater cross sectional diameter than the channel formed by said terminal end and counterbored nut.

4. The coupling and seal for a pipe connection as set forth in claim 1 and wherein the annular seal is initially formed with a smaller inner diameter than the cylindrical exterior of the pipe and whereby the nut engaged over the pipe is retained on the pipe by said annular seal stretched thereover.

5. The coupling and seal for a pipe connection as set forth in claim 1 and wherein the annular seal is of O-ring configuration and is initially formed with a smaller inner diameter than the cylindrical exterior of the pipe and whereby the nut engaged over the pipe is retained on the pipe by said annular seal of O-ring configuration stretched thereover.

6. The coupling and seal for a pipe connection as set forth in claim 1, wherein the annular seal is of O-ring configuration initially formed with a smaller inner diameter than the cylindrical exterior of the pipe and with a greater cross sectional diameter than the channel formed by said terminal end and counterbored nut, and whereby the nut on the pipe when stretched thereover is adapted to be forceably distorted into pressured occupancy within said channel.

7. The coupling and seal for a pipe connection as set forth in claim 1 wherein the releasible securing means comprises a bayonet slot and lug engagement between the body and nut.

8. The coupling and seal for a pipe connection as set forth in claim 1 wherein the releasible securing means comprises a balanced arrangement of circumferentially spaced bayonet slot and lug engagements between the body and nut.

9. The coupling and seal for a pipe connection as set forth in claim 1 wherein the releasible securing means comprises a pair of diametrically opposite and circumferentially extended bayonet slot and lug engagements between the body and nut.

10. The coupling and seal for a pipe connection as set forth in claim 1 wherein the releasible securing means comprises a pair of diametrically opposite and circumferentially extended bayonet slots in the cylindrical exterior of the body and complementary lugs projecting from the nut and engageable therewith.

11. The coupling and seal for a pipe connection as set forth in claim 1 wherein the releasible securing means comprises a pair of diametrically opposite and helically extended bayonet slots in the cylindrical exterior of the body and complementary lugs projecting from the nut engageable therewith.

12. A coupling and seal for connecting to the exterior of the end portion of a pipe and including, a tubular body having an enlarged end portion and with a passage extending therethrough opening at a terminal end in a plane normal to the central axis thereof, a nut having a sleeve portion engageable over the enlarged body portion and having a bore therethrough engageable over the cylindrical exterior of the pipe and with a counterbore terminating at a shoulder therein opening at a face opposing said terminal end of the body for stopped engagement, an annular seal of elastomeric material and O-ring configuration compressed in the channel formed by said terminal end and counterbored nut stopped thereby and initially formed with a smaller inner diameter than the cylindrical exterior of the pipe and whereby the nut engaged over the pipe is retained on the pipe by said O-ring stretched thereover and with a greater cross sectional diameter than the channel formed by said combined body and counterbored nut, and releasible securing means comprising a pair of diametrically opposite and helically extended bayonet slots in the cylindrical exterior of the body and complementary lugs projecting from the nut and engageable therewith to draw the nut into working position toward the body.

* * * * *